United States Patent [19]

Koide

[11] Patent Number: 4,645,234
[45] Date of Patent: Feb. 24, 1987

[54] WEBBING GUIDE APPARATUS
[75] Inventor: Teruhiko Koide, Niwa, Japan
[73] Assignee: Kabushiki Kaisha Tokai-Rika-Denki-Seisakusho, Japan
[21] Appl. No.: 753,145
[22] Filed: Jul. 9, 1985
[30] Foreign Application Priority Data Jul. 13, 1984 [JP] Japan .......................... 59-106229[U]

[51] Int. Cl.⁴ ............................................. B60R 21/10
[52] U.S. Cl. ................................................... 280/808
[58] Field of Search ...................... 280/808, 807, 801; 297/482, 483, 486, 481

[56] References Cited

U.S. PATENT DOCUMENTS

| | | | |
|---|---|---|---|
| 3,810,657 | 5/1974 | Campbell | 280/808 |
| 3,907,329 | 9/1975 | Erion et al. | 280/808 |
| 4,060,260 | 11/1977 | Collins | 280/808 |
| 4,323,278 | 4/1982 | Sukopp et al. | 280/808 |
| 4,348,037 | 9/1982 | Law et al. | 280/808 |

Primary Examiner—Richard A. Bertsch
Attorney, Agent, or Firm—Parkhurst & Oliff

[57] ABSTRACT

A webbing guide apparatus is arranged such that an intermediate portion of a shoulder webbing is guided by a guide means provided on a head rest for the purpose of allowing an occupant who is to seat himself or is seated in the back seat of a two-door vehicle to smoothly enter or leave the vehicle. When the seat back rest is inclined toward the front of the vehicle, the angle of pivoting of the guide means with respect to the head rest is properly limited such that the intermediate portion of the webbing is moved upwardly forward of the vehicle in response to the forwardly inclining movement of the seat back rest, thereby enlarging the space where the occupant of the back seat of the vehicle moves when entering or leaving the vehicle.

20 Claims, 4 Drawing Figures 4,645,234

WEBBING GUIDE APPARATUS

BACKGROUND OF THE INVENTION

1. Field of the Invention

The present invention relates to a webbing guide apparatus for use in a seatbelt system designed to protect an occupant of a vehicle when an emergency situation occurs, the apparatus being employed to guide an intermediate portion of a shoulder webbing in such a manner as to ensure a space which is required for an occupant who is to seat himself or is seated in the back seat when he enters or leaves the vehicle.

2. Description of the Prior Art

In seatbelt systems of the above-described type, an occupant restraining webbing has one end thereof secured to a webbing retractor which is secured to an appropriate portion of the vehicle body. One type of seatbelt system has the webbing retractor secured to a roof member of the vehicle. In this arrangement, the intermediate portion of the shoulder webbing which is wound off from the retractor is retained near the upper end of a seat back rest for an occupant in such a manner that it is possible for the occupant seating himself in the seat to be brought into an optimal webbing fastened condition conveniently.

Accordingly, when this type of seatbelt system is employed for an occupant in the front seat of a two-door vehicle, the following problem is experienced. Namely, when an occupant who is to seat himself or is seated in the back seat inclines the seat back rest of the front seat toward the front of the vehicle in order to obtain a space which allows him to pass the rear of the seat back rest for the purpose of entering or leaving the vehicle, that portion of the shoulder webbing which extends between its intermediate portion retained near the upper end of the seat back rest and the webbing retractor secured to the roof member is unfavorably disposed such as to cross the space for the occupant to leave or enter the vehicle, which fact disadvantageously disturbs the occupant entering or leaving the vehicle.

SUMMARY OF THE INVENTION

In view of the above-described condition, it is a primary object of the present invention to provide a webbing guide apparatus which permits the occupant of the back seat to easily enter or leave the vehicle even in the two-door vehicle.

To this end, the invention provides a webbing guide apparatus in which a guide member is provided on a seat such as to project therefrom and adapted to retain the intermediate portion of the shoulder webbing in such a manner that the webbing is movable in its longitudinal direction, whereby, when the seat is inclined toward the front of the vehicle, the webbing intermediate portion is raised, and it is thereby possible to ensure a space required for the occupant of the back seat to enter or leave the vehicle easily.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DESCRIPTION OF THE PREFERRED EMBODIMENTS

Figure 1:
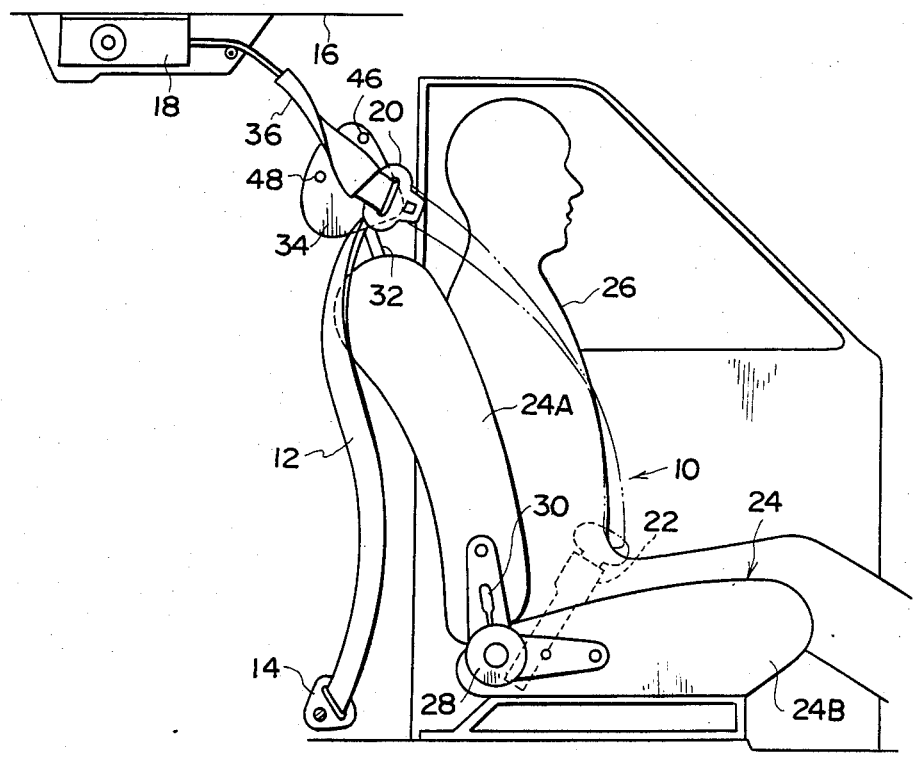
FIG. 1 is a front elevational view of a seatbelt system to which a first embodiment of the webbing guide apparatus according to the invention is applied, as viewed from the right-hand side of the vehicle.

Referring first to FIG. 1, there is shown a seatbelt system 10 to which a first embodiment of the webbing guide apparatus of the invention is applied. It is to be noted that FIG. 1 shows an occupant 26 who has seated himself on the right-hand side of the front seat of the vehicle as viewed from the right-hand side of the vehicle, the right-hand side wall of the vehicle being omitted.

In this seatbelt system 10, an occupant restraining webbing 12 has one of the ends thereof secured to the right-hand side wall of the vehicle through an anchor plate 14 and the other end wound up into a webbing retractor 18 which is secured to a roof member 16 of the vehicle. The webbing retractor 18 winds up the webbing 12 by means of a biasing force and incorporates an inertia-lock mechanism which abruptly stops the wind-off of the webbing 12 when a vehicular emergency situation occurs.

A tongue plate 20 is retained on an intermediate portion of the webbing 12 in such a manner as to be movable longitudinally of the webbing 12. The tongue plate 20 is engageable with a buckle device 22 which projects from the substantially central portion of the vehicle.

Accordingly, when the occupant 26 who has seated himself in a seat 24 engages the tongue plate 20 with the buckle device 22, he is fastened by two portions of the webbing 12, that is, one which extends between the retractor 18 and the buckle device 22 and which serves as a shoulder webbing, and the other which extends between the buckle device 22 and the anchor plate 14 and which serves as a lap webbing.

The seat 24 has a seat back rest 24A pivotally supported by a seat cushioning 24B through a reclining adjuster 28. It is possible for the reclining condition of the seat back rest 24A to be adjusted to a desired angle by actuating an operating lever 30.

A head rest 34 is supported by the seat back rest 24A through a stay 32, thereby allowing the occupant 26 to rest his head thereon.

Figure 2:
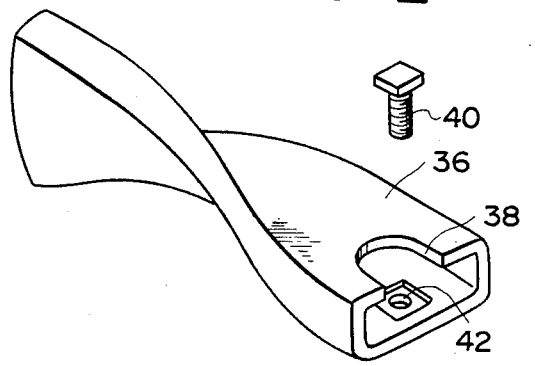
FIG. 2 is an exploded perspective view of a guide boot and its associated elements, which are employed in the webbing guide apparatus shown in FIG. 1.
Figure 2:
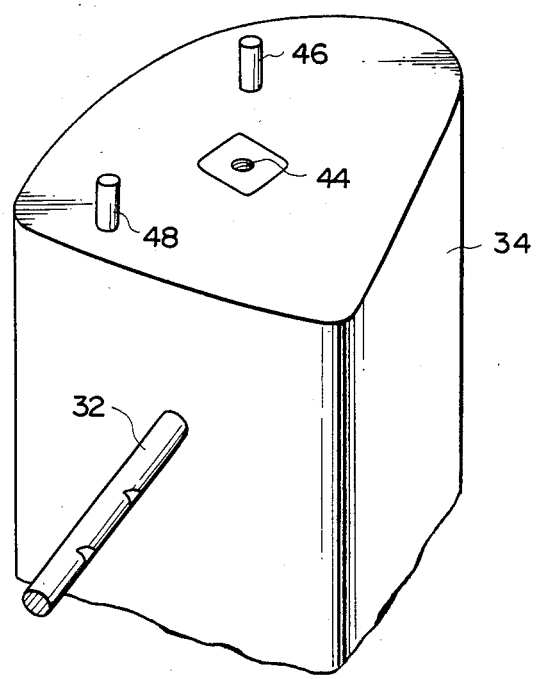

A guide boot 36, which is also shown in FIG. 2, is mounted on the head rest 34. The guide boot 36 is formed from a synthetic resin such as to have a rectangular cross-section in the widthwise direction. The guide boot 36 has such a shape that it is twisted 90° at its longitudinally central portion about its longitudinal axis so that the boot 36 can smoothly guide the twisted portion of the webbing 12 which extends from the retractor 18 to the body of the occupant 26.

The guide boot 36 has a notch 38 formed at one end thereof which allows a mounting bolt 40 to pass through the notch 38 when it is received through a bolt mounting bore 42 which is formed in the boot 36 and corresponds to the notch 38. The bolt 40 passing through the bore 42 is screwed into an internal thread 44 which is so formed in the head rest 34 that the guide boot 36 may be mounted on the head rest 34 in such a manner as to be pivotal about the mounting bolt 40.

On the other hand, the head rest 34 has a pair of stopper pins 46, 48 projecting from one side surface thereof in correspondence with the guide boot 36 in such a manner as to limit the angle of pivoting of the guide boot 36 about the mounting bolt 40.

Accordingly, when the webbing 12 passes through the guide boot 36 in the manner shown in FIG. 1, the webbing 12 has the intermediate portion of its shoulder webbing part retained by the head rest 34 through the guide boot 36.

The following is a description of the operation of the embodiment arranged as above.

FIG. 1 shows the occupant 26 not being fastened by the webbing 12. In this state, the retractor 18 has the webbing 12 wound up thereinto from one end of the webbing 12. The occupant 26 moves the tongue plate 20 toward the front of the vehicle and then engages the plate 20 with the buckle device 22, whereby it is possible for the occupant 26 to be fastened by the webbing 12. At this time, the part of the webbing 12 which extends between the tongue plate 20 and the retractor 18 and which constitutes the shoulder webbing has its intermediate portion retained by the head rest 34 through the guide boot 36. The shoulder webbing is consequently brought into close contact with the body of the occupant 26 in an appropriate state, and the occupant 26 is thus placed in an optimal webbing fastened condition.

When the vehicle runs into an emergency situation such as a collision, the webbing 12, which is supported by the vehicle body through the anchor plate 14, the retractor 18 and the buckle device 22, restrains the occupant 26 and hence protects him.

To leave the vehicle, the occupant 26 disengages the tongue plate 20 from the buckle device 22. Thereupon, the webbing 12 is returned to the state shown by the solid line in FIG. 1.

Figure 3:
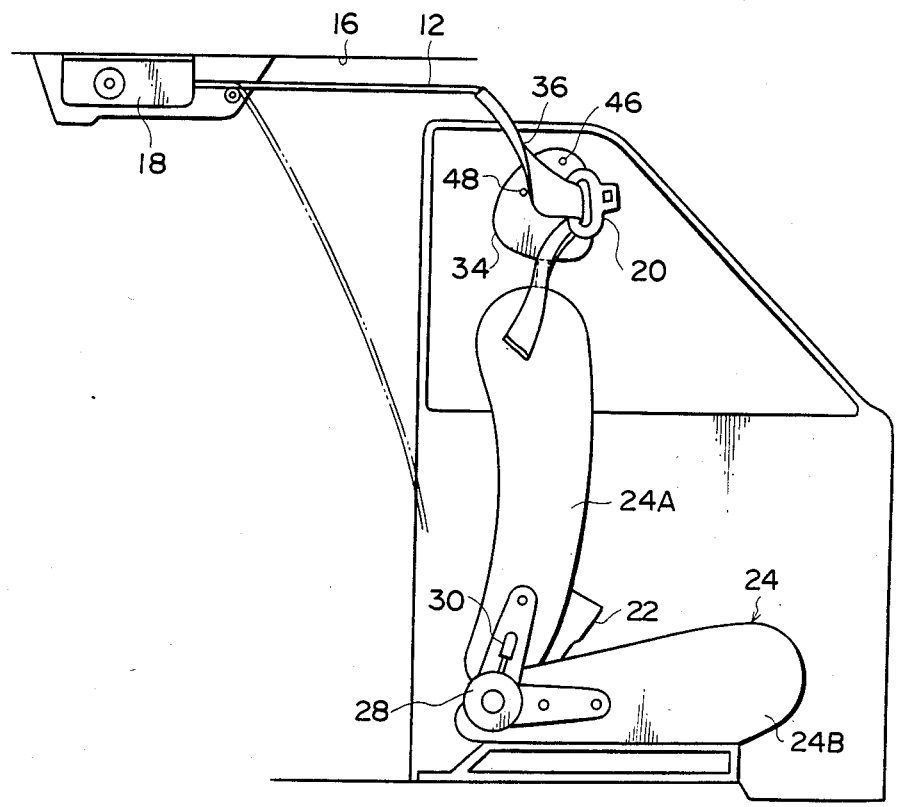
FIG. 3 is a front elevational view of the webbing guide apparatus shown in FIG. 1 in an operative state.

When the occupant who is to seat himself or is seated in the back seat enters or leaves the vehicle, he actuates the operating lever 30 so that the seat back rest 24A is inclined toward the front of the vehicle as shown in FIG. 3. Thus, it is possible for him to pass the rear of the seat back rest 24A in order to enter or leave the vehicle. In response to the forwardly inclining movement of the seat back rest 24A, the stopper pin 48 causes the guide boot 36 to be raised to a substantially vertical position. Consequently, the portion of the webbing 12 which is passing through the guide boot 36 is raised toward the upper side of the vehicle by means of the distal end portion of the guide boot 36 which constitutes a guide portion. Accordingly, it is possible to ensure a space required for the occupant of the back seat to enter or leave the vehicle. Unlike the conventional arrangement of the webbing which is shown by the imaginary line in FIG. 3, the arrangement of the invention involves no possibility of the webbing 12 crossing the space where the occupant passes when entering or leaving the vehicle. It is therefore possible for the occupant to enter or leave the vehicle smoothly and comfortably.

Figure 4:
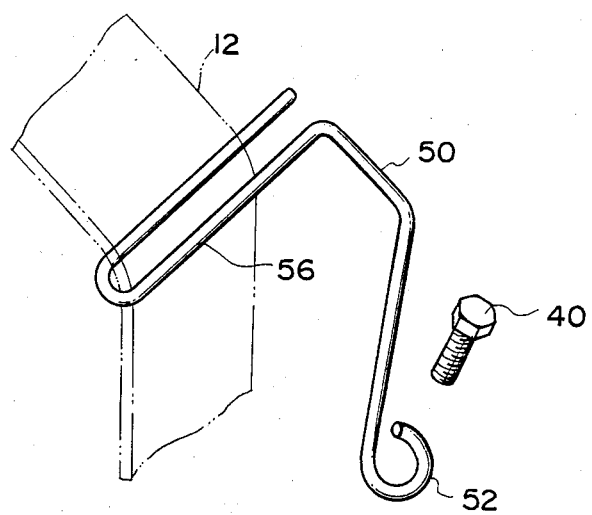
FIG. 4 is an exploded perspective view of a second embodiment of the webbing guide apparatus according to the invention.

Referring now to FIG. 4, there is shown a second embodiment of the webbing guide apparatus according to the present invention. In this embodiment, a rod member 50 is employed in place of the guide boot 36 in the first embodiment. The rod member 50 has a loop portion 52 formed at one end thereof, and the mounting bolt 40 is passed through the loop portion 52 so as to pivotally mount the rod member 50 to the head rest 34 in a manner similar to that in the first embodiment. The other end of the rod member 50 is bent into a substantilly U-shape to provide a guide portion 56 through which the intermediate portion of the webbing 12 is passed.

Accordingly, in this embodiment also, the rod member 50 makes it possible to ensure the space which is required for the occupant of the back seat to enter or leave the vehicle when the seat back rest is forwardly inclined, by properly limiting the angle of pivoting of the rod member 50 about the mounting bolt 40.

It is to be noted that, although the guide boot 36 or the rod member 50 is mounted on the head rest 34 in the above-described embodiments, these members, which are employed to guide the intermediate portion of the webbing 12, may be directly mounted on the seat back rest 24A.

As has been described above, in the webbing guide apparatus of the invention, a guide member which projects from the seat is employed to retain the intermediate portion of the webbing in such a manner that the webbing is movable longitudinally thereof. Accordingly, when the seat is forwardly inclined, the guide member raises the intermediate portion of the webbing, so that it is advantageously possible to ensure a space required for the occupant of the back seat to smoothly enter or leave the vehicle.

What is claimed is:

1. A webbing guide apparatus employed in a seatbelt system in which one end of a shoulder webbing is housed in a roof portion of the body of a vehicle, said apparatus comprising:

guide means for restraining an intermediate portion of said webbing in such a manner that said webbing is movable in its longitudinal direction, said guide means being pivotally supported by a seat back rest of the vehicle or a head rest which is mounted on said seat back rest; and means for limiting the range of pivoting of said guide means so as to raise a distal end of said guide means toward to roof of said vehicle when the seat back rest is inclined toward the front of the vehicle;

whereby, when said seat back rest is forwardly inclined, a space which allows an occupant to smoothly enter or leave a back seat of said vehicle is provided.

2. A webbing guide apparatus according to claim 1, wherein said guide means has one end thereof supported by said seat back rest and a tube shape which allows said webbing to pass through the inside of said guide means.

3. A webbing guide apparatus according to claim 2, wherein said guide means is pivotally supported by a head rest which projects from said seat back rest and is thereby supported by said seat back rest through said head rest.

4. A webbing guide apparatus according to claim 3, wherein said limiting means comprises by a pin which projects from said head rest and abuts against said guide means.

5. A webbing guide apparatus according to claim 2, wherein said guide means is twisted at its longitudinally central portion about its longitudinal axis so as to smoothly guide a twisted portion of said webbing which extends between said roof portion and an occupant fastening portion of said webbing.

6. A webbing guide apparatus according to claim 5, wherein said guide means is pivotally supported on said head rest by a mounting bolt, said guide means having a notch formed on a side of said guide means which is remote from the side of said guide means which is pivotally supported on said head rest or said seat back rest, said notch allowing said mounting bolt to pass therethrough when it is tightened.

7. A webbing guide apparatus according to claim 1, wherein said guide means comprise by a rod member which has one end thereof pivotally supported by said seat back rest and has a webbing guide portion formed at its distal end.

8. A webbing guide apparatus according to claim 7, wherein said webbing guide portion is formed by bending the distal end portion of said rod member into a substantially U-shape, said guide portion being employed to receive the intermediate portion of said webbing.

9. A webbing guide apparatus for use in a seatbelt system in which one end of a shoulder webbing is housed in a roof portion of the body of a vehicle, said apparatus comprising:
 (a) guide means for retaining an intermediate portion of the webbing, said guide means having one end thereof supported by a seat back rest or a head rest which is mounted on said seat back rest;
 (b) means for pivotally supporting said guide means on said seat back rest or said head rest; and
 (c) means for limiting the pivoting of said guide means about its pivotally supported portion,
 whereby, when said seat back rest is inclined toward the front of said vehicle, the intermediate portion of said webbing is caused to move forwardly and toward the roof of said vehicle in response to the forwardly inclining movement of said seat back rest, thereby providing a space so that an occupant can smoothly enter or leave a back seat of said vehicle.

10. A webbing guide apparatus according to claim 9, wherein said guide means has a tube shape which allows said webbing to pass through the inside thereof.

11. A webbing guide apparatus according to claim 9, wherein said guide means is twisted at its longitudinally central portion about its longitudinal axis so as to smoothly guide a twisted portion of said webbing which extends between said roof portion and an occupant fastening portion of said webbing.

12. A webbing guide apparatus according to claim 9, wherein said limiting means comprises at least one abutting member which is provided on said head rest and adapted to contact said guide means when said guide means is pivoted, whereby, when said seat back rest is forwardly inclined, the pivoting angle of said guide means is limited, and the intermediate portion of said webbing is thereby moved forward and toward the roof of said vehicle in response to the forwardly inclining movement of said seat back rest.

13. A webbing guide apparatus according to claim 12, wherein said limiting means comprises by a pin which projects from said head rest and abuts against said guide means.

14. A webbing guide apparatus according to claim 9, wherein said guide means comprises by a rod member which has one end thereof pivotally supported by said seat back rest and has a webbing guide portion formed at its distal end.

15. A webbing guide apparatus according to claim 14, wherein said webbing guide portion is formed by bending the distal end portion of said rod member into a substantially U-shape, said guide portion being employed to receive the intermediate portion of said webbing.

16. A webbing apparatus employed in a seatbelt system in which a tongue plate is retained on an intermediate portion of a continuous webbing which has one end thereof secured to a lower portion of the body of a vehicle and the other end secured to a roof portion of the vehicle body, said apparatus comprising:
 (a) guide means pivotally supported by a head rest which is mounted on a seat back rest, said guide means being adapted to allow the intermediate portion of said webbing to pass through the inside thereof, and said guide means having a distal end projecting from said head rest; and
 (b) means for limiting the range of pivoting of said guide means, said limiting means being provided between said head rest and said guide means,
 whereby, when said seat back rest is inclined toward the front of said vehicle, the intermediate portion of said webbing is bent in such a manner as to move forwardly and toward the roof portion of said vehicle, thereby providing a space which is required for an occupant to smoothly enter or leave a back seat of said vehicle.

17. A webbing guide apparatus according to claim 16, wherein said guide means is twisted at its longitudinally central portion about its longitudinal axis so as to smoothly guide a twisted portion of said webbing which extends between said roof portion and an occupant fastening portion of said webbing.

18. A webbing guide apparatus according to claim 16, wherein said means for limiting the range of pivoting of said guide means comprises by a pin which projects from said head rest.

19. A webbing guide apparatus according to claim 16, wherein said guide means comprises by a rod member which has one end thereof pivotally supported by said seat back rest and has a webbing guide portion formed at its distal end.

20. A webbing guide apparatus according to claim 19, wherein said webbing guide portion is formed by bending the distal end portion of said rod member into a substantially U-shape, said guide portion being employed to receive the intermediate portion of said webbing.

* * * * *